US008388192B2

(12) United States Patent
Guercio

(10) Patent No.: US 8,388,192 B2
(45) Date of Patent: Mar. 5, 2013

(54) ADJUSTABLE REFLECTOR LUMINAIRE

(75) Inventor: Vincenzo Guercio, Wallkill, NY (US)

(73) Assignee: RAB Lighting Inc., Northvale, NJ (US)

( * ) Notice: Subject to any disclaimer, the term of this patent is extended or adjusted under 35 U.S.C. 154(b) by 553 days.

(21) Appl. No.: 12/103,048

(22) Filed: Apr. 15, 2008

(65) Prior Publication Data

US 2009/0257233 A1 Oct. 15, 2009

(51) Int. Cl.

*F21V 17/02* (2006.01)
*F21V 7/00* (2006.01)
*B60Q 1/14* (2006.01)

(52) U.S. Cl. ........ 362/320; 362/282; 362/297; 362/301; 362/306; 362/346

(58) Field of Classification Search .................. 362/278, 362/306, 282–283, 297, 301–302, 346
See application file for complete search history.

(56) References Cited

U.S. PATENT DOCUMENTS

| | | | | |
|---|---|---|---|---|
| 4,007,365 | A * | 2/1977 | Stempfle et al. | 362/283 |
| 4,599,684 | A * | 7/1986 | Lee | 362/346 |
| 4,729,077 | A | 3/1988 | Gordin et al. | |
| 4,866,584 | A | 9/1989 | Plewman | |
| 5,020,252 | A * | 6/1991 | De Boef | 40/564 |
| 5,025,356 | A * | 6/1991 | Gawad | 362/221 |
| 5,249,109 | A | 9/1993 | Denison et al. | |
| 5,418,699 | A * | 5/1995 | Tazawa | 362/255 |
| 5,615,943 | A * | 4/1997 | Coldren | 362/220 |
| 6,203,176 | B1 | 3/2001 | Gordin | |
| 6,290,373 | B1 | 9/2001 | Dwight et al. | |
| 6,338,564 | B1 * | 1/2002 | Jordan et al. | 362/346 |
| 6,720,566 | B2 * | 4/2004 | Blandford | 250/504 R |
| 6,942,363 | B1 | 9/2005 | LeVasseur | |
| 7,553,049 | B2 * | 6/2009 | Raby et al. | 362/306 |
| 7,677,764 | B2 * | 3/2010 | Lin | 362/283 |

* cited by examiner

*Primary Examiner* — David J Makiya

(74) *Attorney, Agent, or Firm* — Stewart & Irwin, P.C.; Dennis S. Schell

(57) ABSTRACT

The disclosure provides a luminaire having an adjustable light reflector affording a selection of flood pattern lighting.

20 Claims, 9 Drawing Sheets

ADJUSTABLE REFLECTOR LUMINAIRE

FIELD

The disclosure relates to a luminaire or lighting fixture. As adapted, the disclosure may find most frequent application in outdoor use, but naturally may be used in indoor applications. A reflector capable of being configured into various shapes facilitates adjustment of the light pattern.

BACKGROUND

Users of luminaires often are obliged to obtain luminaires specifically designed to provide a 'flood' of light over a broad area. Users would benefit from the availability to adapt a single luminaire for adjustable degrees of flood applications.

Various means have been employed to provide variable light patterns from a single luminaire. Typically, light pattern adjustment has been provided by movement of the lamp with respect to a fixed reflector such as U.S. Pat. Nos. 6,290,373, 5,249,109, and 4,729,077.

SUMMARY

The present disclosure provides a variable light pattern but leaves both the lamp and reflector of a luminaire in the same relative longitudinal position but adjusts the shape of the reflector to provide a variable light pattern from a luminaire.

The present disclosure includes a luminaire configured to provide a plurality of flood patterns of light, the luminaire comprising a housing, a hatch attached to the housing, a lamp attached to the housing, a reflector fastened to the housing, and an adjustor attached to the housing, the reflector configured to adjust orientation by engaging the adjustor to provide the plurality of flood patterns of light.

The present disclosure also includes a luminaire configured to provide a flood pattern of light, the luminaire comprising a housing, an adjustor attached to the housing, and a reflector fastened to the housing, the reflector configured to adjust orientation, the reflector configured to adjust the flood pattern of light by engaging the adjustor.

The present disclosure also includes a luminaire configured to provide a plurality of flood patterns of light, the luminaire comprising a housing, a reflector fastened to the housing, and an adjustor attached to the housing, whereby the reflector engages the adjustor to provide the plurality of flood patterns of light.

DETAILED DESCRIPTION OF EMBODIMENTS

Figure 1:
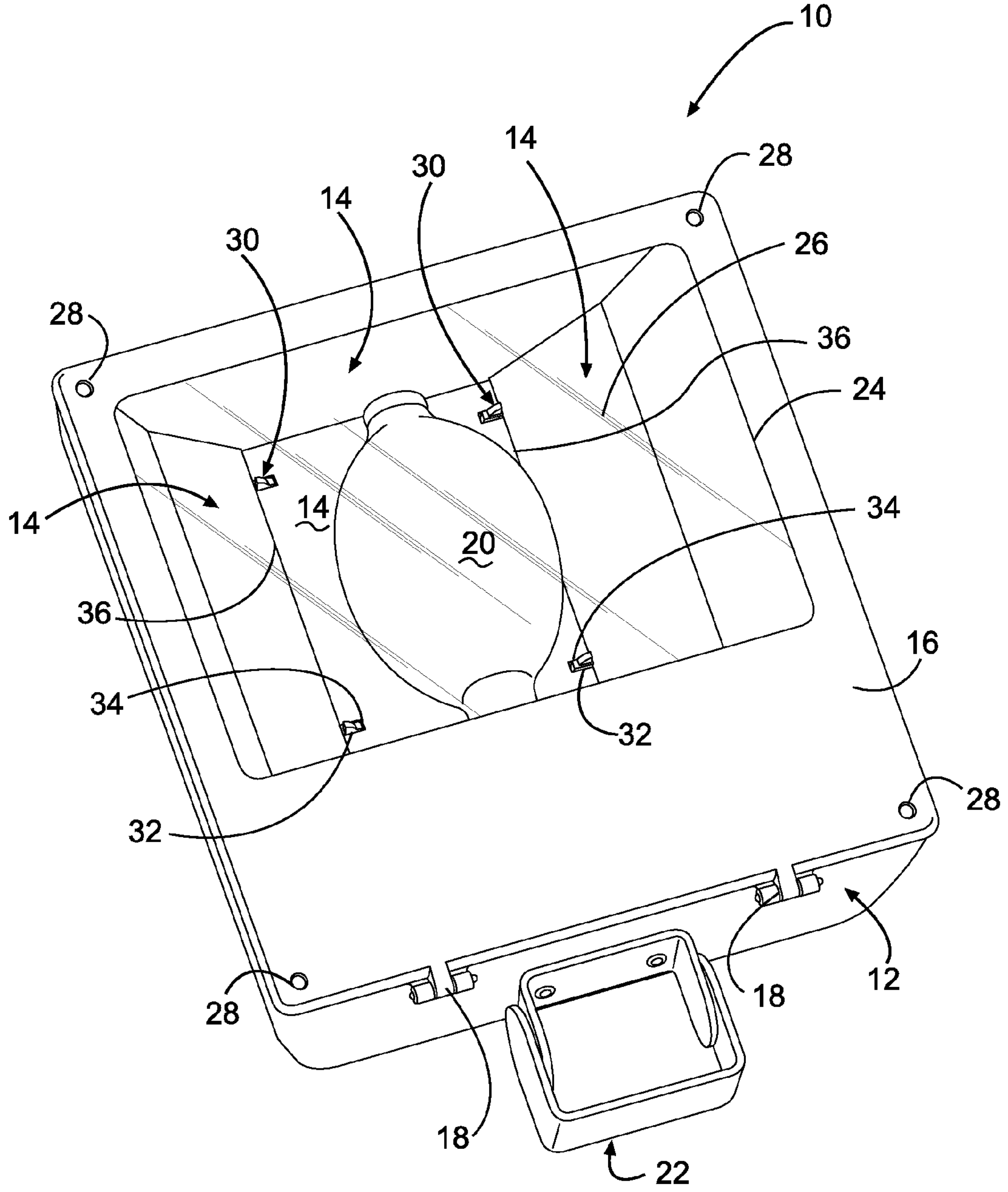
FIG. 1 illustrates a perspective view of an adjustable reflector luminaire according to an embodiment of the disclosure.

In the description following reference characters in the several views are designated with like reference numerals.

In FIG. 1, luminaire 10 is shown. Luminaire 10 includes housing 12, reflectors 14, hatch 16 coupled by hinges 18 to housing 12, and optionally includes lamp 20. Housing 12 is configured to support other parts of luminaire 10 including reflectors 14, hatch 16 and lamp 20 as discussed in greater detail below. Housing 12 is also coupled to support portion 22. Support portion 22 is configured to couple luminaire 10 to any support fixture such as walls, doors, poles and any other similar support components.

Figure 3:
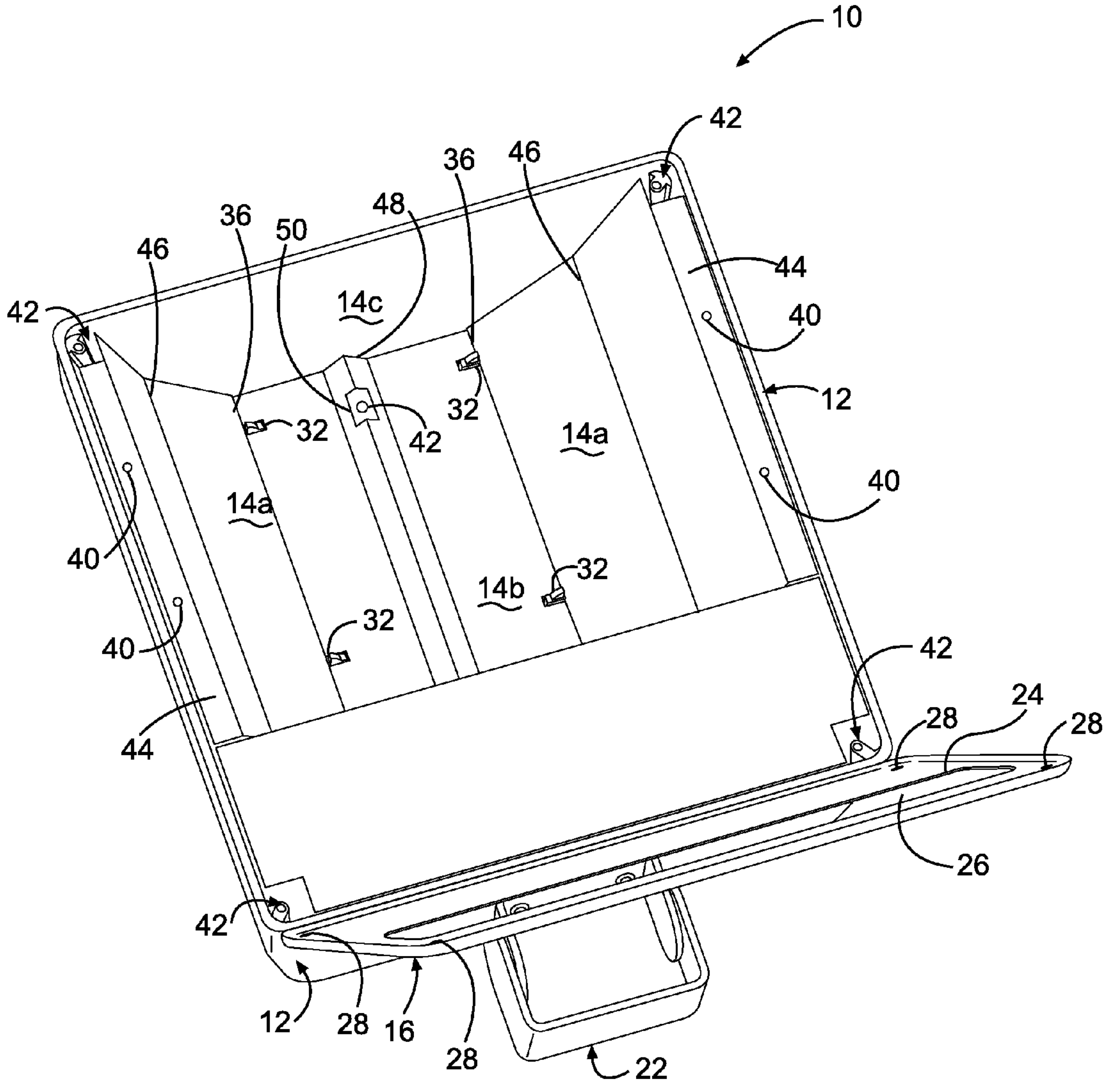
FIG. 3 is a perspective view of the luminaire of FIG. 1 in a wide flood position according to an embodiment of the disclosure.

Reflectors 14 may include a single unitary structure or a plurality of reflector pieces. As illustrated in FIGS. 1 and 3, reflectors 14 include side reflectors 14*a*, back reflector 14*b*, and end reflectors 14*c*, each of which are discussed in greater detail below. Each kind of reflector 14 is coupled to and supported by housing 12.

Hatch 16 defines opening 24. Hatch 16 also supports glass 26 or other transparent substance 26. In this embodiment, glass 26 is substantially located within opening 24. Hatch 16 and glass 26 may each be provided with appropriate gaskets (not shown) and seals (not shown) to prevent water from entering luminaire 10. Light from lamp 20 is configured to pass through glass 26 in order to create a flood pattern or other pattern of light. Glass 26 may also comprise a lens or a curved transparent material to refract or deflect light rays from lamp 20 as part of providing a pattern of light, such as a flood pattern. As shown in this embodiment, hatch 16 also defines apertures 28. Apertures 28 are part of a fastening mechanism to secure hatch 16 to housing 12 in a closed position, as shown in FIG. 1. The illustrated fastening mechanism is one of several alternative embodiments, such as adhesive, latches, clamps, etc., to provide hatch 16 in an open or closed arrangement.

As also shown in FIG. 1, luminaire 10 includes adjusters 30. Adjusters 30 are discussed in greater detail in association with FIG. 8. In one embodiment, adjusters 30 are illustrated as ratchet adjusters. In this embodiment, adjusters 30 are shown to include engaging portions 32, such as teeth 32. Back reflector 14*b* defines apertures 34. Adjustors 30 and teeth 32 are shown located at least partially within apertures 34. As illustrated in FIG. 1, edges 36 of side reflectors 14*a* engage teeth 32.

Figure 2:
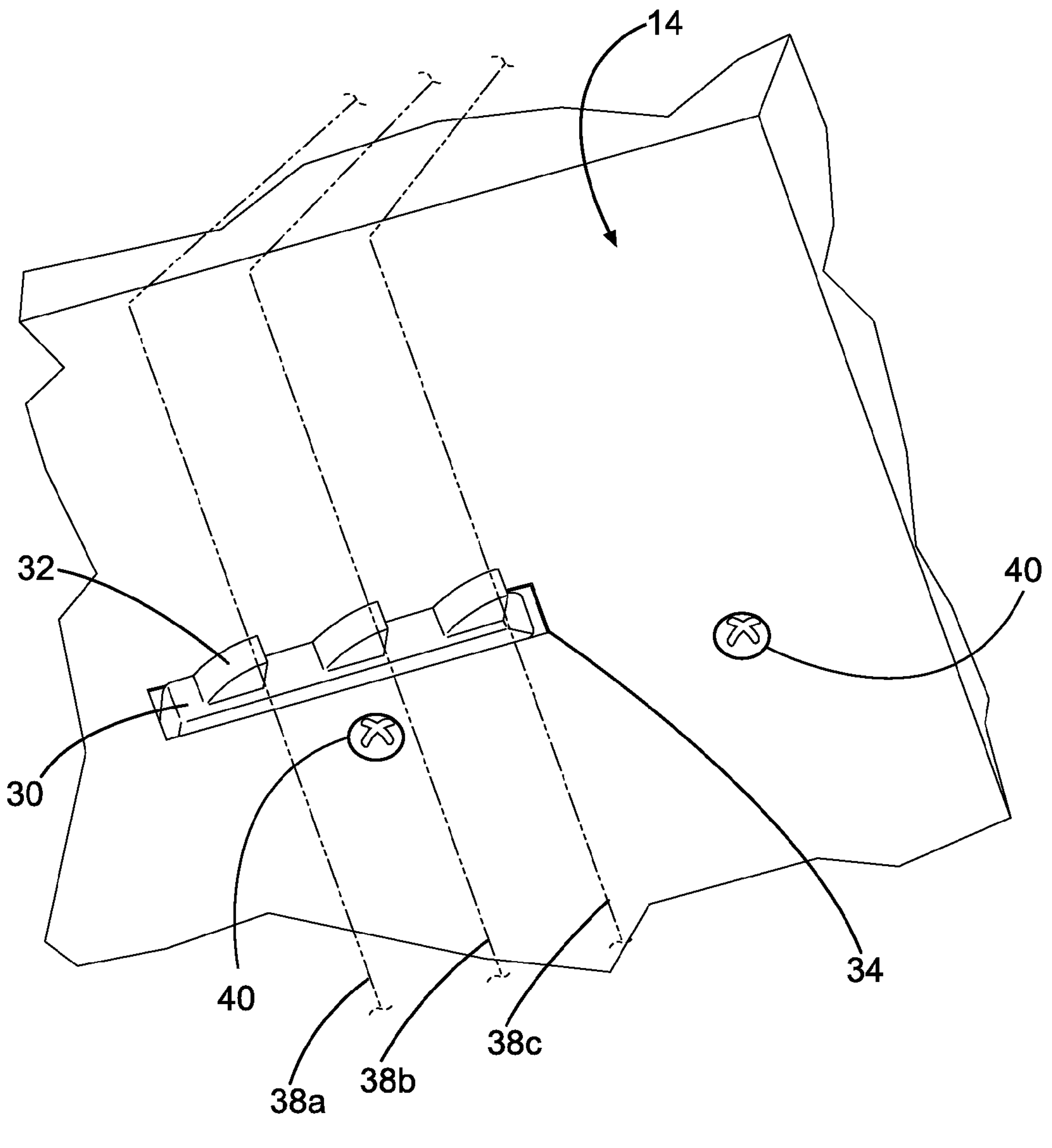
FIG. 2 is a perspective, cut-away view of ratchet adjusters for the luminaire according to FIG. 1.

Now referring to FIG. 2, a portion of reflector 14 is shown along with adjuster 30. As previously disclosed in FIG. 1, edge 36 of reflectors 14 engage teeth 32 of adjuster 30. Phantom lines 38*a*, 38*b* and 38*c* illustrate alternative engagement positions of edge 36. As discussed in greater detail below, phantom line 38*a* illustrates a wide flood pattern, phantom line 38*b* illustrates a standard flood pattern, and phantom line 38*c* illustrates a narrow flood pattern.

FIG. 2 illustrates ratchet adjuster 30 fastened reflector 14 by a suitable fastening mechanism. In this embodiment, FIG. 2 illustrates the use of fasteners 40, such as screws 40, as a suitable fastening mechanism. Fasteners 40 are illustrated to couple adjuster 30 to reflector 14 as well as to couple reflector 14 to housing 6 (FIG. 1). Adjuster 30 is shown to include three teeth 32. However, adjustor 30 may include any number of teeth 32 or placement of teeth 32 along adjuster 30. Adjustor

30 may include teeth 32 or engaging portions 32 of any dimension. Similarly, engagement positions for edge 36 may include any number, placement, or dimension.

Now referring to FIG. 3, luminaire 10 is shown in a wide flood position, corresponding to 38*a* (FIG. 2). As illustrated in FIG. 3, lamp 20 (FIG. 1) is removed for illustrative purposes. The corresponding support member (not shown) for lamp 20 is also not shown for illustrative purposes. As illustrated in FIG. 3, housing 12 includes bosses 42. In this embodiment, bosses 42 are shown as integral. In other embodiments, bosses 42 are a structure separate from housing 12. Bosses 42 perform several functions such as a securing portion of a suitable fastening mechanism. Bosses 42 are used to fasten hatch 16 to a closed and locked position adjacent to housing 12. As best illustrated by FIGS. 1 and 3, bosses 42 align with apertures 28 and fasteners 40 such as screws 40 are positioned through apertures 28 and secured to bosses 42.

As previously described reflectors 14 may comprise a single unitary structure or a plurality of reflector pieces. As illustrated in FIG. 3, reflectors 14 include side reflectors 14*a*, back reflector 14*b* and end reflectors 14*c*. Reflectors 14 are secured to housing 12 by use of any suitable fastening mechanism. As also illustrated in FIG. 3, fasteners 40 are secured to housing 12 through apertures in reflectors 14. Then fasteners 40 are secured to openings within bosses 42 of housing 12.

As illustrated in FIG. 3, reflectors 14 include ends 44 coupled to housing 12 by use of fasteners 40. Side reflectors 14*a* also define folds 46. Side reflectors 14*a* are illustrated as fixed to housing 12 at ends 44, positioned in part due to folds 46, and engaged with teeth 32 along edge 36. Side reflectors 14*a* abut back reflector 14*b* along edge 36. Engagement of edge 36 illustrates a wide flood pattern, corresponding to phantom line 38*a* (FIG. 2). Fold 46 allows reflectors 14 to position, fold, or adjust such that edge 36 engages teeth 32. Reflectors 14 may be made of thin yet resilient materials such as aluminum, steel, or a thermoplastic or thermoset polymer, or any combination thereof.

Back reflector 14*b* optionally includes raised portion 48. Raised portion 48 directs light away from lamp 20 (FIG. 1). Raised portion 48 is configured to reduce light from lamp 20 that is directed back into lamp 20, as is understood by one of ordinary skill in the art. Light striking raised portion 48 is further directed over a flood type pattern. Raised portion 48 defines opening 50. Opening 50 provides access to boss 42 of housing 12 to support a support mechanism (not shown) for lamp 20 (FIG. 1).

Figure 4:
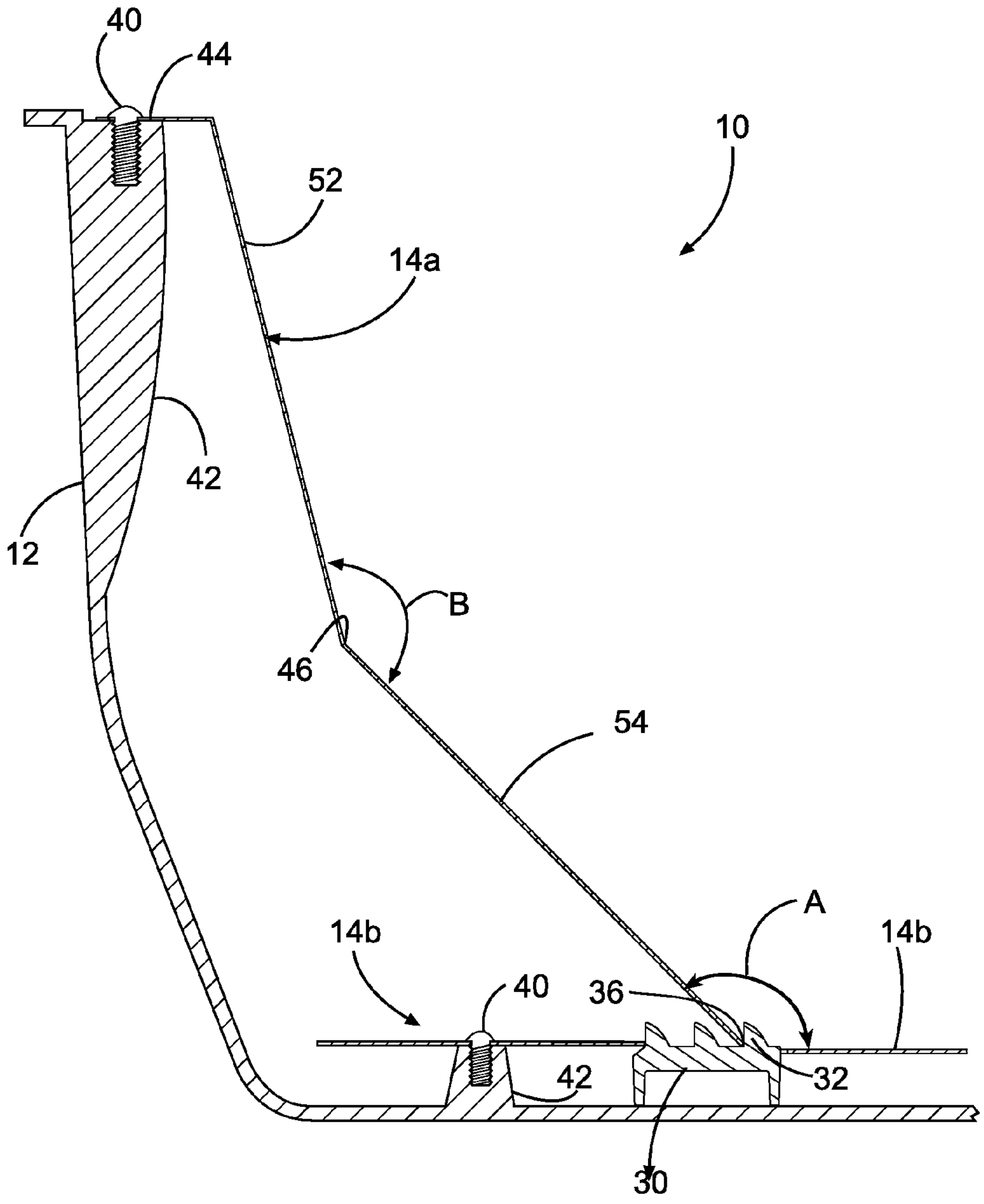
FIG. 4 is a cut-away sectional view of the luminaire of FIG. 3.

As shown in FIG. 4, a portion of luminaire 10 is shown in a wide flood pattern, corresponding to phantom line 38*a*. As previously described, fold 46 allows edge 36 to engage tooth 32. Fold 46 also defines two portions of side reflector 14*a*. First portion 52 of side reflector 14*a* is between terminal end 44 and fold 46. Second portion 54 of side reflector 14*a* is between fold 46 and edge 36. As illustrated, angle A is the angle between second portion 54 and back reflector 14*b*. As illustrated, angle B is the angle between first portion 52 and second portion 54.

As also shown in FIG. 4, back reflector 14*b* is secured to housing 12 by any suitable fastening mechanism, such as fasteners 40 secured to boss 42 of housing 12. It is understood that one of ordinary skill in the art could envision fasten back reflector 14*b* to housing 12 through several other fastening mechanisms.

As also shown in FIG. 4, adjustor 30 is located adjacent to housing 12. In an alternative embodiment, adjustor 30 fixed to housing 12. In another alternative embodiment, adjustor 30 is adjustably fixed to housing 12 such that adjustor 30 can translate in relation to housing 12 while remaining fastened to housing 12. Furthermore in this embodiment, it is envisioned where adjustor 30 can be adjusted from the exterior of luminaire 10. It is understood that one of ordinary skill in the art could configure several arrangements where adjustor 30 is adjustably fastened to housing 12 and adjustable outside from housing 12. Adjustors 30 may be employed alone or with a plurality of adjusters 30 at other positions around housing or adjacent to housing 12. Furthermore, adjustors 30 may be employed with any form of reflectors 14, such as a single unitary structure, or plurality of reflector pieces.

Figure 5:
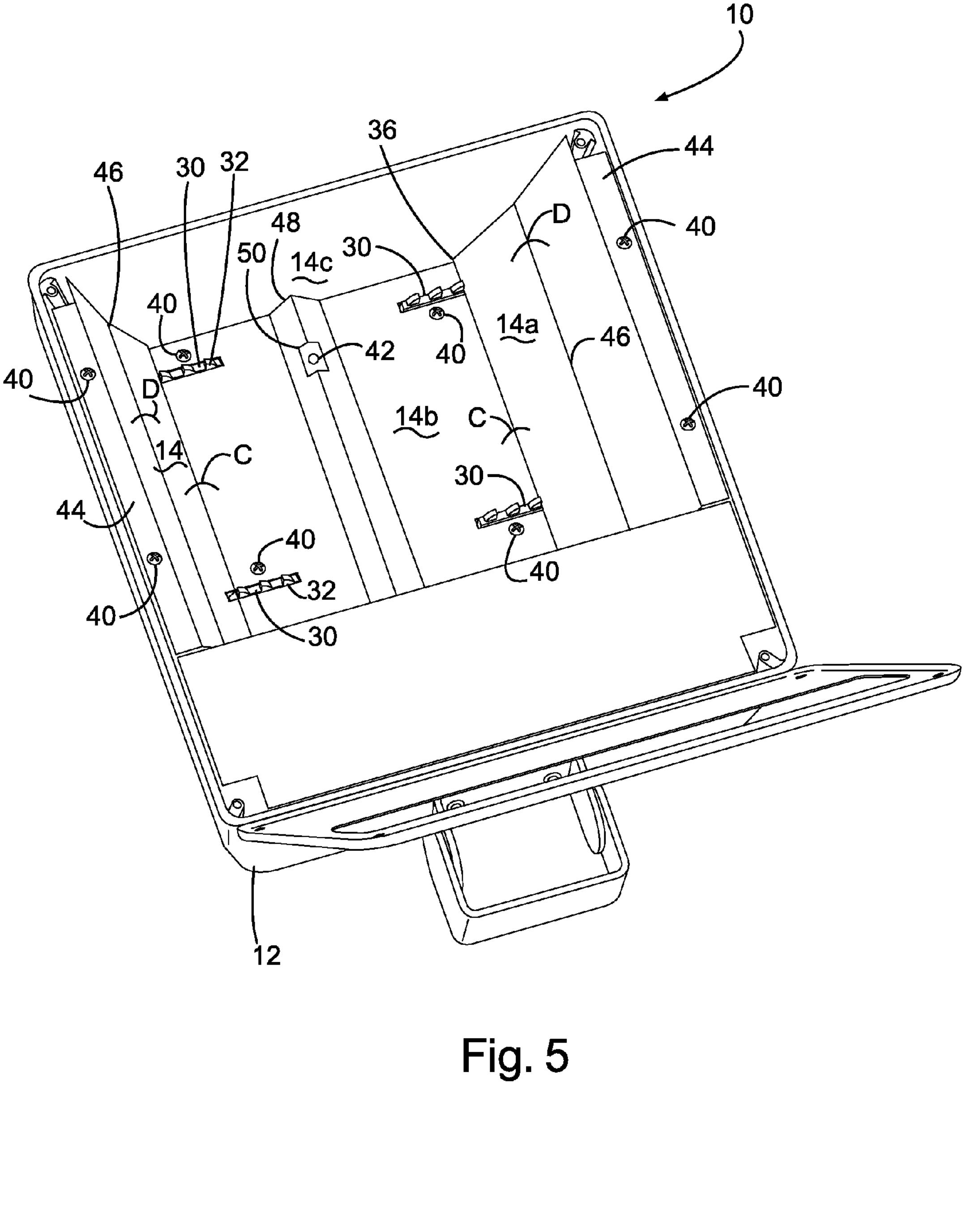
FIG. 5 is a perspective view of a luminaire in a narrow flood position according to another embodiment of the disclosure.
Figure 6:
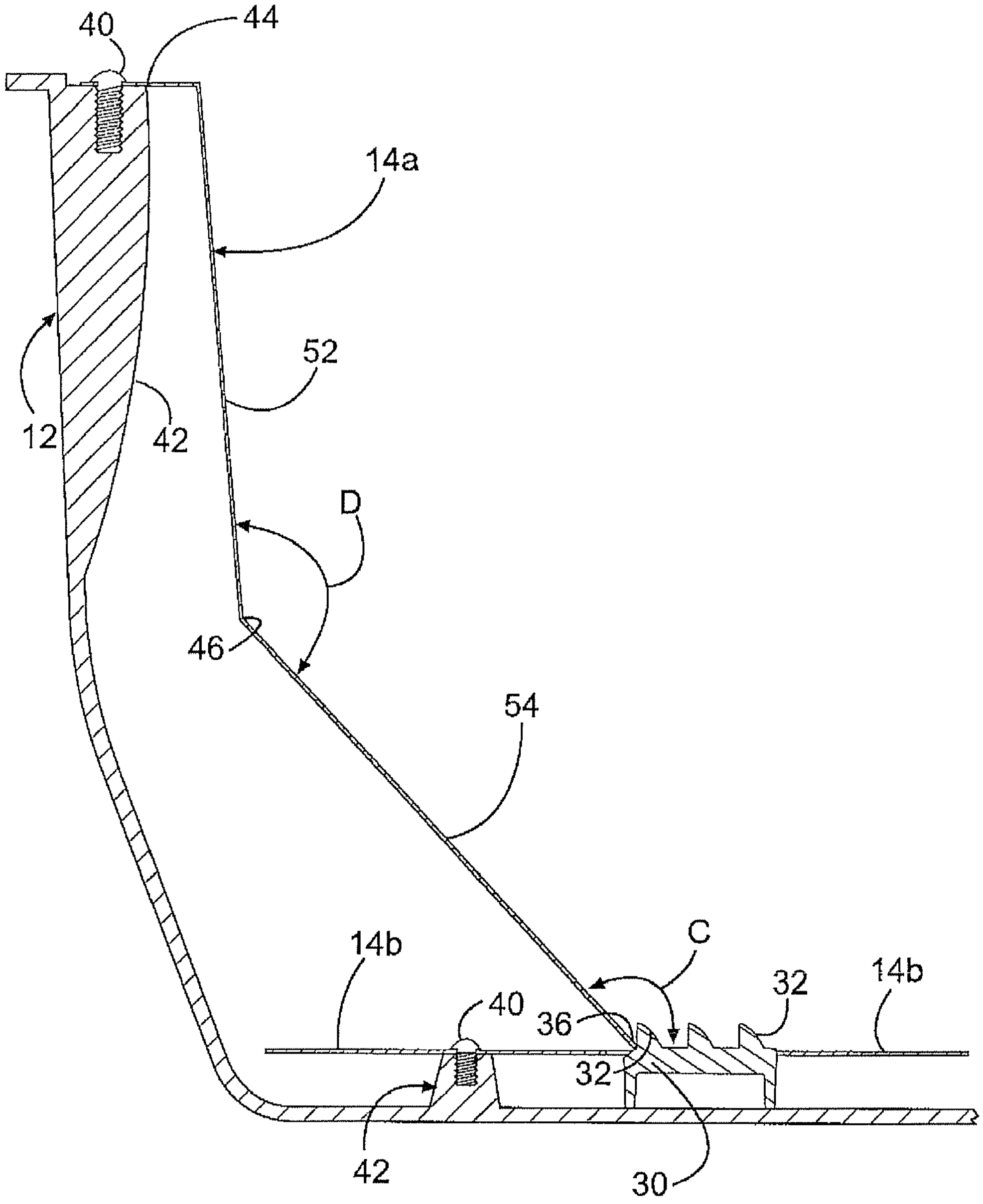
FIG. 6 is a cut-away sectional view of the luminaire of FIG. 5.

As illustrated in FIG. 5, luminaire 10 is shown in a narrow flood pattern. The setup of luminaire 10 in FIG. 5 is essentially similar to what is shown in FIG. 3, except for the following differences. In FIG. 5, edge 36 engages tooth 32 of adjustor 30 adjacent to or corresponding to phantom line 38*c* (FIG. 2). Similarly, as shown in FIG. 6, angle C is defined similar to angle A (FIG. 4). However, angle C is more acute angle than angle A. As illustrated the relationship between second portion 54 and back reflector portion 14*b* is closer to perpendicular in FIG. 6 than in FIG. 4. Also, angle D is defined in a similar manner to angle B (FIG. 4). However, angle D is more obtuse than angle B. As illustrated the relationship between first portion 52 and second portion 54 is closer to becoming parallel in FIG. 6 than in FIG. 4.

Figure 7:
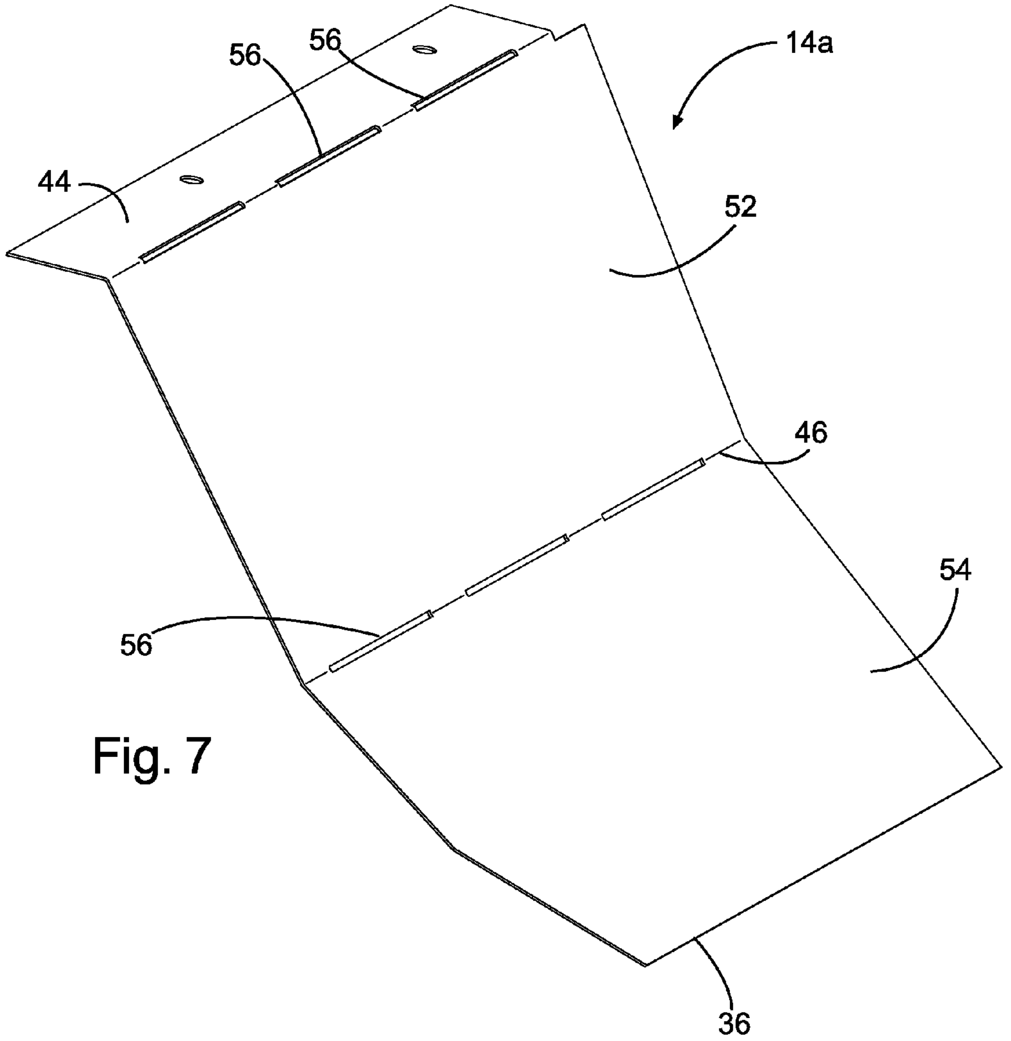
FIG. 7 is a perspective view of an adjustable reflector.

In FIG. 7, side reflector portion 14*a* is shown. As previously described, side reflector portion 14*a* includes terminal end 44 configured to couple to housing 12, first portion 52, as well as second portion 54. In the embodiment, side reflector 14*a* includes fold 46. In this embodiment, fold perforations 56 are shown to assist in or to facilitate folding of side reflector 14*a*. Although three perforations 56 per fold 46 are shown, the number, shape and location of perforations 56 may be influenced by a number of factors, including aesthetics, convenience of manufacturer, size of luminaire 10 and material construction of side reflector 14*a*.

Figure 8:
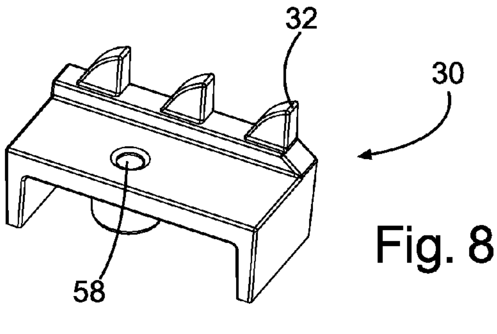
FIG. 8 is a perspective view of an adjustor.

An embodiment of adjustor 30 is illustrated in FIG. 8. Adjustor 30 may comprise a metal such as aluminum, steel or pot metal. Similarly, adjustor 30 may comprise a polymeric material of either thermoset, such as polyester, vinyl ester, epoxy or phenol-formaldehyde, or a thermoplastic such as a glass reinforced nylon, or any combination thereof. The choice of materials may afford further options of manufacture including molding.

Adjustor 30 defines aperture 58. Aperture 58 is shown to illustrate a suitable fastening mechanism including the use of fasteners 40 to couple adjuster 30 to back reflector 14*b*. Alternatively, aperture 58 illustrates a suitable fastening mechanism including the use of fasteners 40 to couple adjustor to housing 12. As shown in the illustrative embodiment, aperture 58 is suitable for accommodating fastener 40.

Figure 9:
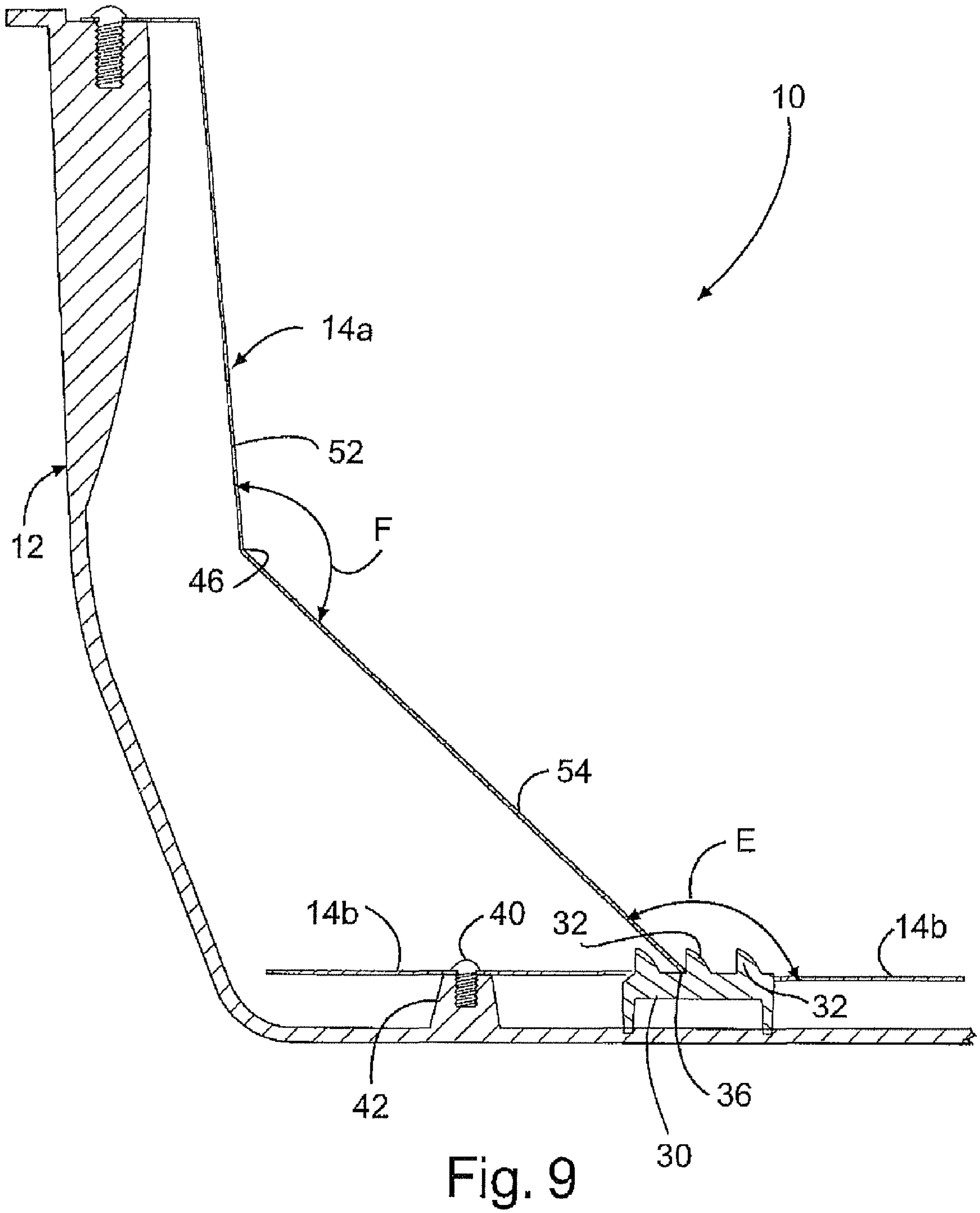
FIG. 9 is a cut-away sectional view of a luminaire in a standard flood position according to yet another embodiment of the disclosure.

In FIG. 9, luminaire 10 is shown in a standard flood pattern. As illustrated angle E is between angle A and angle C, i.e. more acute than angle A but more obtuse than angle C. Similarly, angle F is between angles B and angles D, i.e. more obtuse than angle B but more acute than angle D. In this normal flood position, edge 36 engages tooth 32 corresponding to phantom line 38*b* (FIG. 2).

Figure 10:
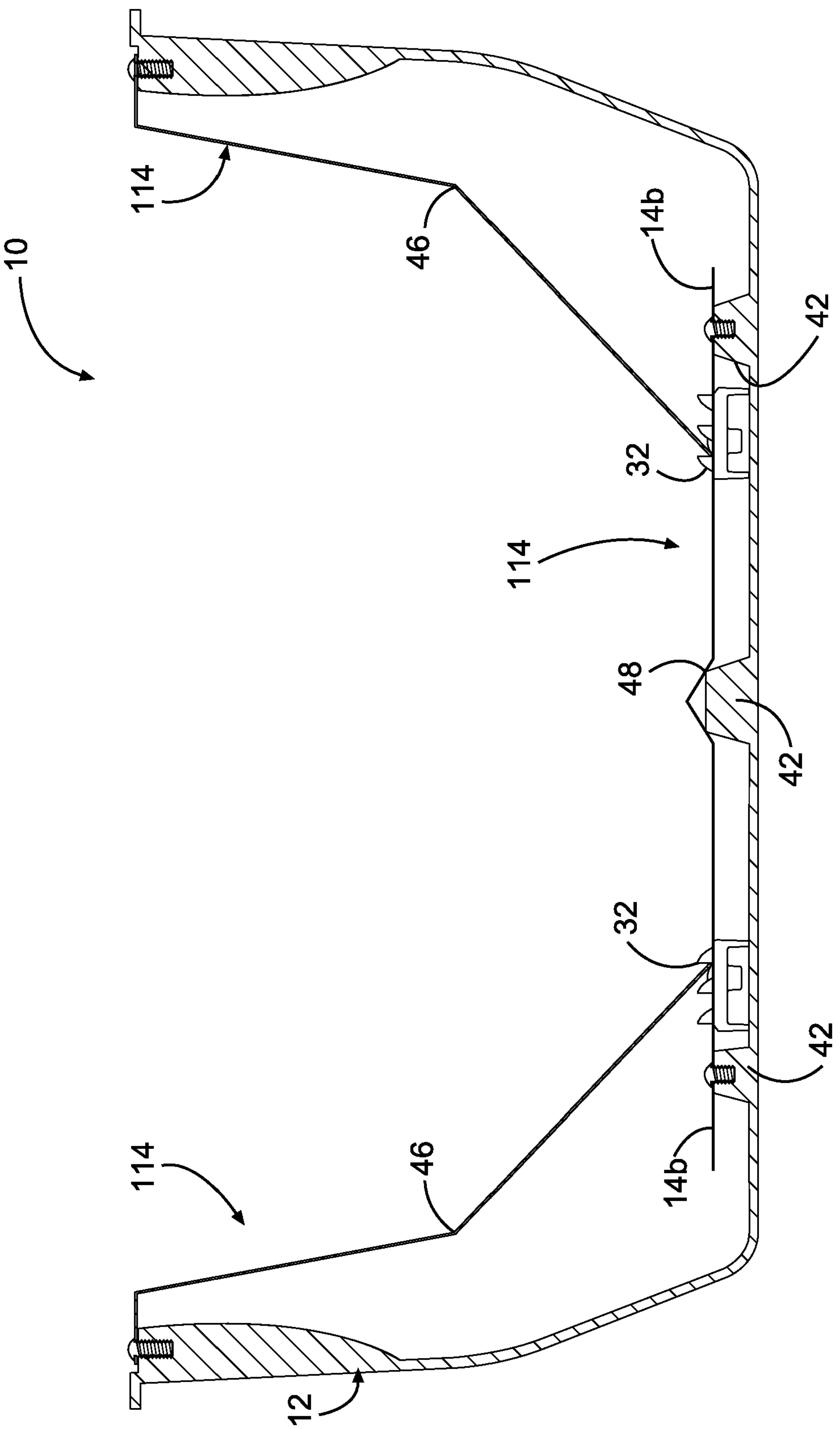
FIG. 10 is a cut-away sectional view of the luminaire of FIG. 3.

In yet another embodiment, as illustrated by FIG. 10, reflector 114 is shown as a continuous unitary structure. Reflector 14 may include perforations 56 (FIG. 7) and/or folds 46. As illustrated, reflector 114 is shown in a wide flood pattern configuration, corresponding to phantom line 38*a* (FIG. 2).

When used to illuminate public spaces at nighttime, the end-user may position reflectors to provide a high degree of reflection and specularity. To accommodate various end-uses, a manufacturer may elect to package more than one reflector having a range of properties to permit the customer to install luminaire 10 that best meets the end-use.

The forgoing description including the Figures are illustrative of the disclosure. The disclosure is defined by the following claims and the full scope of equivalents thereof.

The invention claimed is:

1. A luminaire configured to provide a plurality of flood patterns from a lamp, the luminaire comprising:

a housing, a first reflector having a first and second portion, the first portion fixed to the housing, the second portion defining an edge;

a back reflector positioned on a side of the lamp opposite the direction in which the plurality of flood patterns is provided, the edge of the first reflector abutting the back reflector; and a first adjustor defining a plurality of engaging portions, the first adjustor adapted to provide a plurality of positions for the side reflector radially relative to the lamp, the second portion of the first reflector selectively engagable with each of the plurality of engaging portion, the plurality of engaging portions arranged relative to the back reflector such that the edge of the first reflector abuts the back reflector when the second portion is engaged with each of the plurality of engaging portions, the first reflector and second reflector thereby forming a contiguous reflecting surface and the plurality of flood patterns.

2. The luminaire of claim 1, further comprising a hatch coupled to the housing by at least one hinge, the hatch defining an opening for transparent material capable of transmitting the light.

3. The luminaire of claim 1, wherein the entire length of the edge of the first reflector is in contact with the back reflector.

4. The luminaire of claim 1 wherein the first adjustor is adjustably fixed to the housing such that the adjustor can translate relative to the housing, thereby providing the movement of the first reflector relative to the housing.

5. The luminaire of claim 1 wherein the first portion of the first reflector is defined at one end of the first reflector and the second portion of the first reflector is defined at an opposite end of the first reflector.

6. The luminaire of claim 5 wherein the first reflector defines a first fold between the first portion of the first reflector and the second portion of the first reflector, the second portion rotatable about the first fold relative to the first portion.

7. The luminaire of claim 6, wherein the first reflector defines a second fold between the first fold and the one end, the first portion being rotatable about the second fold relative to the one end.

8. The luminaire of claim 1, further comprising:

a second reflector having a first and second portion, the first portion of the second reflector fixed to the housing on a side opposite the lamp from where the first portion of the first reflector is fixed to the housing; and a second adjustor attached to the housing, the second portion of the second reflector engageable with the second adjustor, the second adjustor adapted to allow movement of the second reflector relative to the housing thereby providing a plurality of flood patterns.

9. The luminaire of claim 1, wherein the back reflector defines an aperature and the first adjustor is positioned at least partially within the aperature.

10. The luminaire of claim 8, wherein the span between the second portions of the first and second reflectors at least in part determines the span of the various ones of the plurality of flood patterns.

11. A luminaire configured to provide a plurality of flood patterns from a lamp, the luminaire comprising:

a housing, a pair of side reflectors coupled to the housing, each side reflector positioned so that the lamp is located therebetween, the pair of side reflectors configured to adjust at least a portion of each side reflectors radially relative to the lamp, each side reflector defining an edge;

a back reflector positioned on a side of the lamp opposite the direction in which the plurality of flood patterns is provided; and an adjustor defining a plurality of engaging portions for engaging the edge of at least one of the pair of side reflectors, the adjustor adapted to provide a plurality of positions for the side reflector radially relative to the lamp, the second portion of the first reflector selectively engagable with each of the plurality of engaging portions, the edge of the at least one of the pair of side reflectors contacting the back reflector in each of the plurality of positions.

12. The luminaire of claim 11, wherein the pair of side reflectors are fixed axially relative to the lamp.

13. The luminaire of claim 11, wherein the entire length of the edge of the at least one of the pair of side reflectors is in contact with the back reflector.

14. The luminaire of claim 11, wherein the back reflector defines an aperature and the adjustor is positioned at least partially within the aperature.

15. The luminaire of claim 14, where the adjustor includes a plurality of teeth adapted to selectively receive a first end of the at least one of the pair of side reflectors.

16. The luminaire of claim 15, wherein a second end of the at least one of the pair of side reflectors is fixed to the housing, the second end being opposite the first end.

17. The luminaire of claim 16, wherein the at least one of the pair of side reflectors defines a first fold between the first and second end, a first portion of the reflector between the second end and the first fold, and a second portion of the reflector between the first end and the first fold, the second portion being rotatable about the first fold relative to the first portion.

18. The luminaire of claim 17, wherein the at least one of the pair of side reflectors defines a second fold between the first fold and the second end, the first portion being rotatable about the second fold relative to the second end.

19. A luminaire configured to provide a plurality of flood patterns of light, the luminaire comprising:

a housing, a lamp attachable to the housing;

a side reflector fastened to the housing and defining an edge;

a back reflector coupled to the housing, the edge of the side reflector moveably abutting the back reflector; and an adjustor defining a plurality of engaging portions, the adjustor adapted to provide a plurality of positions for the side reflector radially relative to the lamp, the edge of the side reflector selectively engageable with each of the plurality of engaging portions, the plurality of engaging portions arranged relative to the back reflector such that the edge of the side reflector abuts the back reflector when the edge is engaged with each of the plurality of engaging portions, the back reflector and side reflector thereby forming a contiguous reflecting surface and the plurality of flood patterns of light; and wherein the entire length of the edge of the side reflector is in contact with the back reflector.

20. The luminaire of claim 19, wherein the reflector is fixed axially relative to the lamp and adjustable radially relative to the lamp.

* * * * *